United States Patent
Mildh et al.

(10) Patent No.: US 8,780,783 B2
(45) Date of Patent: Jul. 15, 2014

(54) PROPAGATING SYSTEM INFORMATION CHANGES TO RELAYS

(75) Inventors: Gunnar Mildh, Sollentuna (SE); Jessica Östergaard, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 13/090,476

(22) Filed: Apr. 20, 2011

(65) Prior Publication Data

US 2011/0268014 A1    Nov. 3, 2011

Related U.S. Application Data

(60) Provisional application No. 61/330,636, filed on May 3, 2010.

(30) Foreign Application Priority Data

Apr. 1, 2011    (WO) .................. PCT/SE2011/050391

(51) Int. Cl.
| | |
|---|---|
| *H04B 7/14* | (2006.01) |
| *H04W 24/02* | (2009.01) |
| *H04B 7/155* | (2006.01) |
| *H04W 72/12* | (2009.01) |
| *H04W 84/04* | (2009.01) |
| *H04B 7/26* | (2006.01) |

(52) U.S. Cl.
CPC .......... *H04W 24/02* (2013.01); *H04W 72/1289* (2013.01); *H04W 84/047* (2013.01); *H04B 7/155* (2013.01); *H04B 7/2606* (2013.01)
USPC ......................................................... 370/315

(58) Field of Classification Search
CPC ........................................................ H04B 7/14

USPC .................................. 370/315, 252; 455/437
See application file for complete search history.

(56) References Cited

U.S. PATENT DOCUMENTS

| | | |
|---|---|---|
| 6,718,158 B1 | 4/2004 | Suonvieri |
| 2005/0048914 A1 | 3/2005 | Sartori et al. |

(Continued)

FOREIGN PATENT DOCUMENTS

| | | |
|---|---|---|
| WO | 2005117297 A1 | 12/2005 |
| WO | 2009108768 A1 | 9/2009 |

OTHER PUBLICATIONS

Source: CATT Title:System Information Notification in RN 3GPP TSG RAN WG2 Meeting# 69bis R2- 102029 Beijing, China, Apr. 12-16, 2010 p. 1-3.*

(Continued)

*Primary Examiner* — Chi Pham
*Assistant Examiner* — Fahmida Chowdhury
(74) *Attorney, Agent, or Firm* — Coats & Bennett, PLLC (57) ABSTRACT

Teachings herein include a base station for propagating system information changes from the base station to the relay node. Upon transmitting system information changes to the relay node, the base station defers data transmission between the base station and the relay node until a set time period. In many embodiments, the base station is configured to actually apply the system information changes during this time period, while the relay node applies the changes before then, e.g., by applying them immediately upon reception. The base station's deferral of data transmission until the set time period thus ensures that data transmission does not occur until both the base station and the relay node have applied the pending changes. This in turn prevents radio link failure from occurring due to use of different system parameters by the base station and relay node.

22 Claims, 4 Drawing Sheets

(56) References Cited

U.S. PATENT DOCUMENTS

| | | | |
|---|---|---|---|
| 2010/0097978 A1* | 4/2010 | Palanki et al. | 370/315 |
| 2011/0044233 A1* | 2/2011 | Cho et al. | 370/315 |
| 2011/0222428 A1* | 9/2011 | Charbit et al. | 370/252 |
| 2012/0008550 A1* | 1/2012 | Chen et al. | 370/315 |
| 2012/0069790 A1* | 3/2012 | Chung et al. | 370/315 |
| 2012/0093071 A1* | 4/2012 | Huang et al. | 370/315 |
| 2012/0287836 A1* | 11/2012 | Lee et al. | 370/312 |

OTHER PUBLICATIONS

3rd Generation Partnership Project, Source NTT DOCOMO, Inc., "System Information Change Notification in Relay Operation," 3GPP TSG-RAN WG2 #68bis, R2-100259, pp. 1-2, Jan. 18-22, 2010, Valencia, Spain.

3rd Generation Partnership Project, Source Ericsson, ST-Ericsson, Acquisition of DeNB System Information Updates for Relay Nodes, 3GPP TSG-RAN WG2 #70, Tdoc R2-103159, pp. 1-3, May 10-14, 2010, Montreal, Canada.

3rd Generation Partnership Project, Source ZTE, "Considerations on the Timing Relationship Between Un Reconfiguration and Uu Si Update," 3GPP TSG RAN WG2 #69bis, R2-102220, pp. 1-3, Apr. 12-16, 2010, Beijing, CN.

3rd Generation Partnership Project. 3GPP TS 36.331, V8.5.0 (Mar. 2009) 3rd Generation Partnership Project; Technical Specification Group Radio Access Network; Evolved Universal Terrestrial Radio Access (E-UTRA) Radio Resource Control (RRC); Protocol specification (Release 8), Mar. 2009.

3rd Generation Partnership Project. "Relays for LTE—Performance Part." 3GPP Work Item Description, RAN WG4, R9-091434, Dec. 4, 2009.

3rd Generation Partnership Project. "System Information Notification in RN." 3GPP TSG RAN WG2 Meeting #69bis, R2-102029, Beijing, China, Apr. 12-16, 2010.

3rd Generation Partnership Project. "BCH Reception in Relay Operation." 3GPP TSG-RAN WG2 #69bis, R2-102336, Beijing, China, Apr. 12-16, 2010.

3rd Generation Partnership Project. "System Information Modicaition for Relay Node." 3GPP TSG-RAN WG2 #69bis, R2-102336, Beijing, China, Apr. 12-16, 2010.

3rd Generation Partnership Project, "Radio Resource Control (RRC); Protocol specification", 3GPP TS 36.331 V10.0.0, Dec. 2010, Technical Specification Group Radio Access Network; Evolved Universal Terrestrial Radio Resource Control (RRC), Release 10.

* cited by examiner

PROPAGATING SYSTEM INFORMATION CHANGES TO RELAYS

RELATED APPLICATIONS

This application claims priority to U.S. provisional patent application Ser. No. 61/330,636, filed May 3, 2010, and to International patent application No. PCT/SE2011/050391, filed Apr. 1, 2011, each of which is incorporated by reference herein in its entirety.

TECHNICAL FIELD

The present invention relates generally to wireless communication systems and more particularly relates to changing system information in wireless communication systems that support relay nodes.

BACKGROUND

The 3rd-Generation Partnership Project (3GPP) is currently standardizing relay nodes (RNs) for the Long Term Evolution (LTE) radio access technology. From a radio propagation perspective, a relay node is positioned between a base station (BS, or called an eNodeB in the LTE standard) and one or more mobile terminals (MT, or called user equipment, UE, in the LTE standard). This way, communications between the base station and the mobile terminals are relayed by the relay node.

Specifically, a relay node connects to an associated base station using the same, standard radio link used by ordinary mobile terminals. The relay node then provides radio access to mobile terminals, effectively emulating a base station from the perspective of the mobile terminals, and uses its radio link to the base station as backhaul transport for terminal data.

While relay nodes improve system coverage and capacity, the nodes introduce complexities to the process of propagating system information changes throughout the system. System information includes parameters that describe general information about the system, including the Public Land Mobile Network (PLMN) ID, the system bandwidth, and the like. System information also includes parameters that describe information specific to certain cells in the system, such as the allocation of control channels, paging channel information, cell selection information, and so on.

Known approaches to propagating changes in system information parameters throughout systems that do not support relay nodes effectively ensure that a base station and its associated mobile terminals apply the changes at the same time. In this regard, the base station and terminals are configured to only apply system information changes during or at the start of predefined modification periods that recur periodically. When system information is to be changed, the base station sends a change notification to the terminals over a paging channel. The change notification informs the terminals that the base station will be broadcasting system information changes at the start of the next modification period. When that period eventually starts, the base station broadcasts the changes, and applies the changes itself. The terminals immediately apply the changes upon receipt so that the changes are applied at approximately the same time as when the base station applies them.

Complexities occur in systems that support relay nodes because the relay nodes may not be able to receive the change notification sent by the base station over the paging channel. Moreover, even if relay nodes are able to receive the change notification, the relay nodes may still not be able to receive the actual changes subsequently broadcasted. For example, relay nodes may transmit and receive using the same frequency band. These "in-band" relay nodes are therefore configured to receive transmissions from the base station during certain time slots (i.e., "downlink time slots"), and to transmit to the mobile terminals during other time slots (i.e., "uplink time slots"). If the base station transmits a change notification or actual changes during an uplink time slot, the relay node will not receive that notification or those changes.

Known proposals suggest transmitting system information changes to a relay node via dedicated signaling, so that the relay node can at least receive the changes. However, under some circumstances, transmitting changes via dedicated signaling in this way can cause radio link failure and/or cause unnecessary system interference.

SUMMARY

Teachings herein include a base station that advantageously propagates system information changes to a relay node while preserving radio link connectivity and mitigating unnecessary system interference. To this end, upon transmitting system information changes to the relay node, the base station may defer data transmission between the base station and the relay node until a later time. In many cases explained more fully herein, this deferral ensures that data transmission does not occur until both the base station and the relay node have applied the pending changes.

In one or more embodiments, the base station includes an interface, a system information controller, and a scheduler. The interface is towards the relay node and is thus configured to communicate with the relay node. The system information controller is configured to send to the relay node, via the interface, a message that includes system information changes. System information changes as used herein refer to changes in operational parameters of the supporting wireless communication system (e.g., the system bandwidth, allocation of control channels, and the like).

Upon the system information controller sending the message with system information changes, the scheduler is configured to defer data transmission between the base station and the relay node until a set time period. In at least some embodiments, deferring data transmission in this way entails dynamically modifying a previously established schedule of data transmissions to or from the relay node. For example, a data transmission previously scheduled to occur after the sending of the system information changes but before the set time period starts is re-scheduled by the scheduler to occur during the set time period (e.g., at the start of that time period, or thereafter).

As suggested above, this deferral may effectively ensure that data transmission does not occur until both the base station and the relay node have applied the pending changes. For example, in many embodiments, the base station is configured to apply the system information changes during the set time period (e.g., synchronously with mobile terminals in the system). The relay node, by contrast, may apply the changes immediately upon receiving them, which occurs before the set time period. In at least one embodiment, for instance, the base station's system information controller sends a control indicator to the relay node that directs the relay node to apply the changes immediately. Or, in another embodiment, the relay node is preconfigured to always apply system information changes immediately upon receipt, without any regard to control indicators received from the base station. Regardless, by the time the set time period occurs and the base station applies the pending changes, the relay node has already applied those changes. Because of this, the base station's deferral of data transmission until the set time period ensures that data transmission does not occur until both the base station and the relay node have applied the pending changes.

Of course, the base station may slightly decreases data rates when it defers data transmission, albeit much less so than if radio link failure were to occur. The base station in some embodiments is therefore configured to only defer data transmission if necessary to preserve radio link connectivity. Otherwise, the base station refrains from deferring data transmission in order to maintain data rates.

For example, in some embodiments, system information changes that would fatally disrupt radio link connectivity if not applied at the base station and relay node at substantially the same time may be classified as fundamental changes, with other system information changes being classified as non-fundamental. In this case, the base station's system information controller is configured to identify each sent system information change as belonging to either a fundamental class or a non-fundamental class. Provided with the class to which each change belongs, the scheduler defers data transmission only if any of the sent changes belong to the fundamental class Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
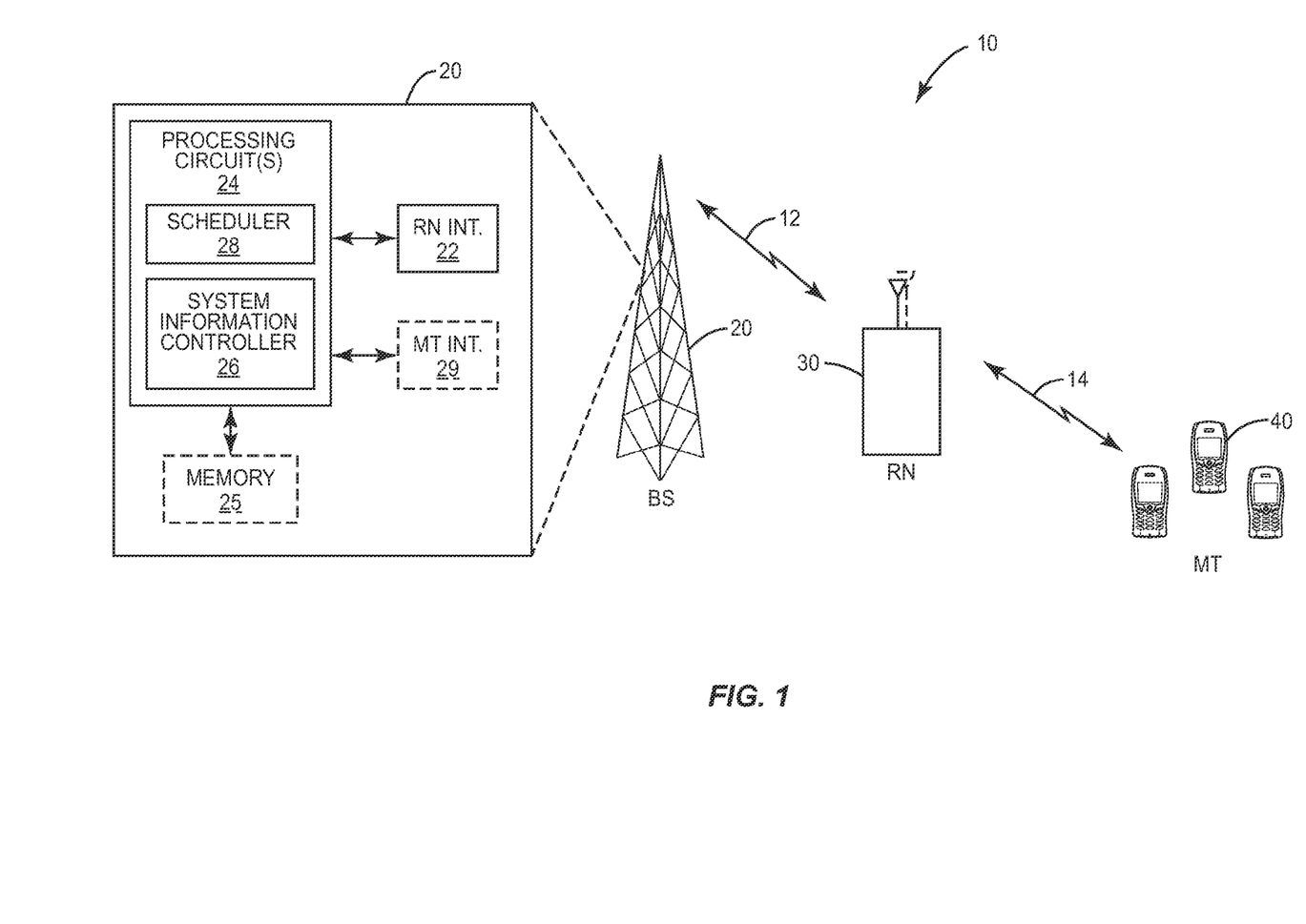
FIG. 1 is a block diagram of a wireless communication system that includes a base station configured according to one or more embodiments of the present invention for propagating system information changes to a relay node.

FIG. 1 depicts a wireless communication system 10 configured to support relay services. The system 10 includes a base station 20, a relay node 30, and one or more mobile terminals 40.

The relay node 30 is configured to relay communications between the base station 20 and the mobile terminals 40. Relayed communications may include control signaling as well as actual data. Regardless, the relay node 30 receives communications from the base station 20 over radio link 12, and relays at least some of those communications to mobile terminals 40 over radio link 14. Other communications (e.g., certain control signaling) received from the base station 20 may in fact be destined for the relay node 30 itself, and therefore is not relayed.

Correspondingly, the base station 20 includes interface 22. Interface 22 is an interface towards the relay node 30 and is configured to communicate with the relay node 30 via radio link 12, such as by sending control signaling and data to the relay node 30. In this regard, the base station 20 further includes one or more processing circuits 24 with a system information controller 26. The system information controller 26 is configured to send control signaling destined for the relay node 30. Specifically, the system information controller 26 is configured to send to the relay node, via interface 22, a message that includes system information changes.

System information changes as used herein refer to changes in operational parameters of the wireless communication system 10. System information changes thus include changes in parameters that generally describe information about the system 10, including the Public Land Mobile Network (PLMN) ID, the system bandwidth, and the like. System information changes also include changes in parameters that describe information specific to certain cells in the system 10, such as the allocation of control channels, paging channel information, cell selection information, neighboring carrier or cell information, information regarding barring of certain services, and so on.

Notably, the base station 20 is configured to propagate these system information changes to the relay node 30 while preserving radio link connectivity and/or mitigating unnecessary system interference. To this end, the base station 20 further includes a scheduler 28. The scheduler 28 is configured, upon the controller 28 sending the message including system information changes, to defer data transmission between the base station 20 and the relay node 30 until a set time period.

Figure 2:
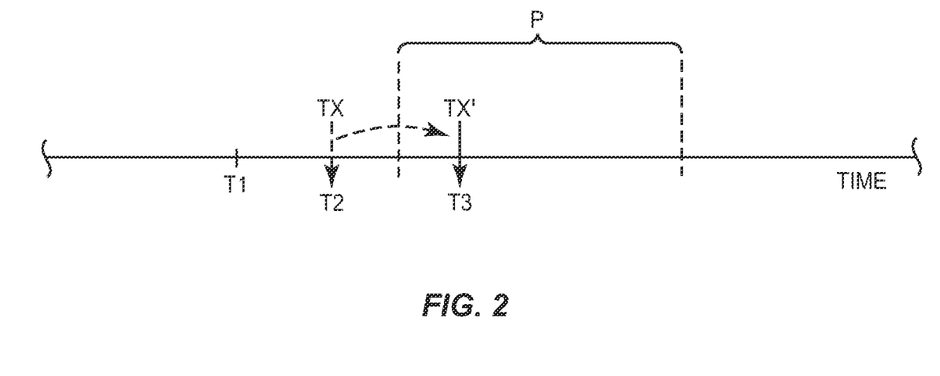
FIG. 2 is a timeline that illustrates deferral of data transmission by a base station according to one or more embodiments.

In at least some embodiments, deferring data transmission in this way entails dynamically modifying a previously established schedule of data transmissions to or from the relay node 30. For example, a data transmission previously scheduled to occur after the sending of the system information changes but before the set time period starts is re-scheduled by the scheduler 28 to occur during the set time period (e.g., at the start of that time period, or thereafter). FIG. 2 illustrates a simple example of these embodiments.

At time T1 in FIG. 2, the system information controller 26 sends a message including system information changes to the relay node 30. When this occurs, the scheduler 28 defers data transmission between the base station 20 and the relay node 30 until a set time period P. Such entails deferring a data transmission TX previously scheduled by the scheduler 28 to occur at time T2. In deferring this data transmission TX, the scheduler 28 re-schedules the data transmission TX to occur as data transmission TX' at time T3 (i.e., during the set time period P).

Figure 3A:
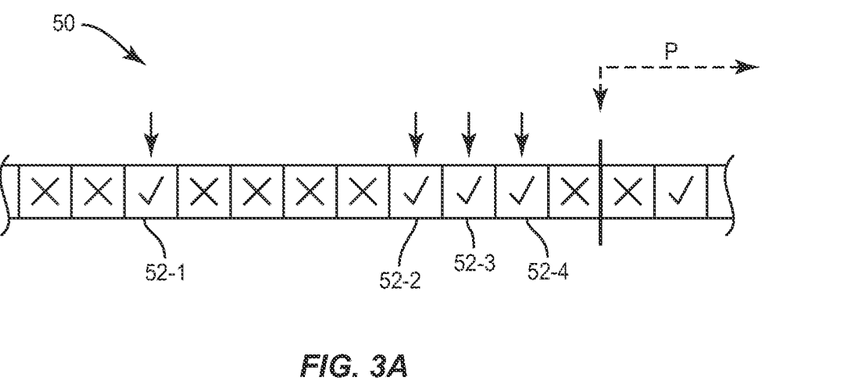
FIGS. 3A-3B illustrate deferral of data transmission by a base station that, according to one or more embodiments, transmits data according to a time slot configuration.
Figure 3B:
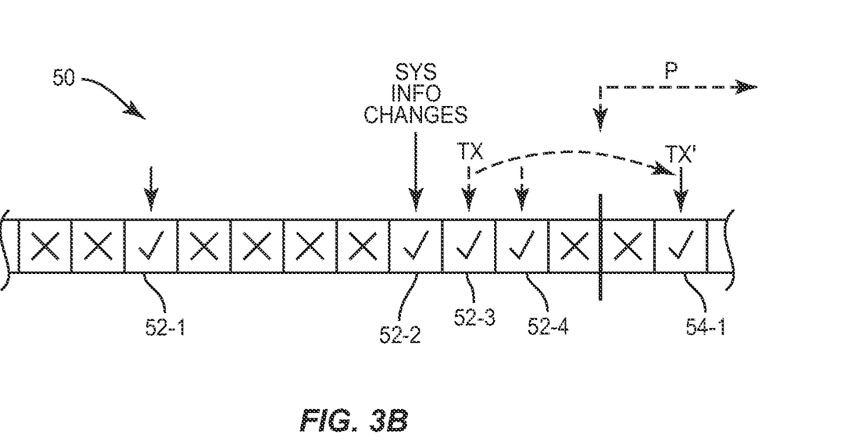

FIGS. 3A-3B depict additional details of this process for certain embodiments. In these embodiments, the base station 20 is configured to transmit data to the relay node 30 according to a particular time slot configuration 50. The time slot configuration 50 specifies permissible time slots (denoted by a check mark, "✓") and non-permissible time slots (denoted by an "X") during which the relay node 30 can and cannot receive data from the base station 20, respectively.

As shown in FIG. 3A, the scheduler 28 has previously scheduled data transmissions to the relay node 30 to occur during permissible time slots 52-1, 52-2, 52-3, and 52-4. But, as shown in FIG. 3B, the system information controller 26 sends system information changes to the relay node 30 during permissible time slot 52-2 (in conjunction with the previously scheduled data transmission). Correspondingly, the scheduler 28 dynamically modifies the schedule of data transmissions so that data transmissions previously scheduled to occur after permissible time slot 52-2 but before the set time period P are deferred until the set time period P. In FIG. 3B, for example, this entails deferring the data transmission TX previously scheduled to occur during permissible time slot 52-3 until the next permissible time slot 54-1 that occurs during the set time period P. Although not shown, the data transmission previously scheduled to occur during permissible time slot 52-4 would be deferred in an analogous manner.

The example in FIGS. 3A-3B demonstrates that the particular time at which deferred data transmissions occur during the set time period P may depend on the time slot configuration 50 of the base station 20. In this example, the next permissible time slot 54-1 that occurred during the set time period P was not the first time slot that occurred during the set time period P (instead, the first time slot was a non-permissible time slot). So, deferred data transmissions in this example did not occur at the start of the set time period P. But, in other embodiments, the next permissible time slot 54-1 that occurred during the set time period P could have in fact been the first time slot. In that case, deferred data transmissions would actually occur at the start of the set time period P.

Also, in at least one embodiment, the time slot configuration 50 discussed above with respect to FIGS. 3A-3B comprises a subframe configuration pattern. In this case, the relay node 30 is a so-called "in-band" relay node because it uses the same frequency for both communication with the base station 20 and communication with the mobile terminals 40 (i.e., the same frequency for both radio links 12 and 14). Using a single frequency, the relay node 30 cannot use both links 12, 14 at the same time without experiencing prohibitive levels of interference. Thus, the base station 20 must communicate with the relay node 30 during gaps in relay-to-terminal communications. The subframe configuration pattern provides such gaps. Also, in case the base station 20 can communicate with some mobile terminals directly using an interface 29 towards those terminals, the subframe configuration pattern permits the base station 20 to at least transmit control signaling to legacy mobile terminals that expect such signaling in every time slot.

More particularly, during the subframe "gaps" created by the subframe configuration pattern, the relay node 30 transmits control signaling (e.g., cell-specific reference signals) in one or more of the first few symbols of the subframe. The rest of the subframe is used for data transmission between the base station 20 and the relay node 30. Accordingly, in terms of the "permissible" and "non-permissible" time slots discussed above with respect to FIGS. 3A-3B, the permissible time slots 52-1, 52-2, 52-3, 52-4, and 54-1 are subframe "gaps." In this context, the base station 20 thus defers data transmission until the next subframe "gap" that occurs during the set time period.

Regardless, in some embodiments, the scheduler's deferral ensures that data transmission occurs only when the base station 20 has applied the system information changes. This facilitates preservation of radio link connectivity and mitigation of unnecessary system interference. In more detail, application of system information changes by the base station 20 entails, in at least some embodiments, updating one or more parameters stored at the base station 20, e.g., in memory 25. Interface 22 may communicate with the relay node 30 over radio link 12 in accordance with these stored parameters. The relay node 30 may apply system information changes in an analogous manner, e.g., by updating parameters stored at the relay node 30. Thus, if the base station 20 and the relay node 30 apply the system information changes and update their respective stored parameters at different times, radio link 12 connectivity between the two may be fatally disrupted. Moreover, use of different stored parameters may actually cause interference to other relay nodes or mobile terminals.

Consider, for example, embodiments where the base station 20 is configured to apply the system information changes during the set time period. The relay node 30 receives the changes before then, and may therefore apply the changes before the base station 20. If so, data transmission attempted during this interim may fail because the base station 20 and the relay node 30 would be using different system parameters. This may ultimately be interpreted as failure of the radio link 12. Accordingly, by deferring data transmission until the set time period, the base station's scheduler 28 ensures that data transmission does not occur until at least the base station 20 has applied the pending changes.

In some embodiments, this also effectively ensures that data transmission does not occur until both the base station 20 and the relay node 30 have applied the pending changes. For example, in at least one embodiment, the base station's system information controller 26 is configured to send a control indicator to the relay node 30 that directs the relay node 30 to apply the system information changes immediately upon receiving them (which occurs before the set time period). Or, in another embodiment, the relay node 30 is preconfigured to always apply system information changes immediately upon receipt, without any regard to control indicators received from the base station 20. Regardless, by the time the set time period occurs and the base station 20 applies the pending changes, the relay node 30 has already applied those changes. Because of this, the base station's deferral of data transmission until the set time period ensures that data transmission does not occur until both the base station 20 and the relay node 30 have applied the pending changes.

Of course, the base station may slightly decreases data rates when it defers data transmission, albeit much less so than if radio link failure were to occur. The base station 20 in some embodiments is therefore configured to only defer data transmission if necessary to preserve radio link connectivity. Otherwise, the base station 20 refrains from deferring data transmission in order to maintain data rates.

In general, system information changes that would fatally disrupt radio link connectivity if not applied at the base station 20 and relay node 30 at substantially the same time may be classified as fundamental changes, with other system information changes being classified as non-fundamental. Examples of fundamental changes include cell bandwidth, control channel allocation (e.g., Physical Uplink Control Channel, PUCCH, in LTE), and other essential information (e.g., Random Access Channel, RACH, in LTE). On the other hand, examples of non-fundamental changes include uplink power control parameters, common time alignment timer parameters, and certain cell-specific information, such as sounding reference signal configuration. If the relay node applies a different sounding reference signal configuration than the base station, for instance, the relay node's transmission of a sounding reference signal in the incorrect subframe will cause unnecessary interference, and that sounding reference signal will not be usable by the base station 20. But, the interference will not break the relay node's connection to the base station 20, or cause significant problems for the mobile terminals 40.

Thus, the system information controller 26 in some embodiments is configured to identify each sent system information change as belonging to either a fundamental class or a non-fundamental class. Provided with the class to which each change belongs, the scheduler 28 defers data transmission only if any of the sent changes belong to the fundamental class. That is, if any of the sent changes are fundamental and would jeopardize radio link connectivity, the scheduler 28 defers data transmission. Otherwise, if all of the sent changes are non-fundamental and would not jeopardize radio link connectivity, the scheduler 28 does not defer data transmission. This way, in systems that most often change non-fundamental system information as opposed to fundamental system information, the scheduler 28 most often refrains from deferring data transmission in order to maintain data rates, while only occasionally deferring data transmission in order to preserve radio link connectivity.

Note that the base station's application of system information changes during the set time period may be part of a larger effort to apply the changes synchronously with the mobile terminals 40. In some embodiments, for example, the set time period is "set" in the sense that it comprises the next time period in a series of time periods that recur with a periodicity set by the system 10. Each of these recurring time periods is referred to herein as a modification period. The set periodicity of modification periods is known throughout the system 10, or at least to the base station 20 and mobile terminals 40. Because of this, modification periods can help coordinate synchronous application of system information changes among the base station 20 and the mobile terminals 40.

Indeed, in various embodiments, both the base station 20 and the mobile terminals 40 are configured to apply the system information changes at the start of the next modification period. Since the base station 20 is committed to the mobile terminals 40 in this way, it cannot simply apply the changes immediately upon sending them to the relay node 30 (in an effort to instead apply the changes synchronously with the relay node 30). According to embodiments herein, then, because the base station 20 cannot apply the system information changes synchronously with the relay node 30, the base station 20 instead ensures that data transmission does not occur until both the base station 20 and the relay node 30 have applied the system information changes. That is, the base station 20 defers data transmission until at least the start of the next modification period.

Those skilled in the art will of course appreciate that the above embodiments have been described as non-limiting examples, and have been simplified in many respects for ease of illustration. For instance, descriptions above have generalized communications between the base station 20 and the relay node 30 as simply occurring over a radio link 12. Likewise descriptions above have generalized communications between the relay node 30 and mobile terminals 40 as occurring over radio link 14. As suggested in some embodiments, though, the relay node 30 uses the same frequency for both of these radio links 12, 14. That is, the relay node 30 comprises an "in-band" relay node. In this case, much of the communication discussed above between the base station 20 and the relay node 30 may occur through dedicated signaling (e.g., the system information changes, data transmissions, and, where applicable, control indicators are communicated via dedicated signaling).

Also, the above embodiments have not been described in the context of any particular type of wireless communication system. In this regard, no particular communication interface standard is necessary for practicing the present invention. That is, the wireless communication system 10 may be any one of a number of standardized system implementations that support relaying of communications between a base station and mobile terminals via a relay node. As one particular example, the system 10 may implement Long Term Evolution (LTE) or LTE-Advanced standards. In this case, the base station 20 may be referred to as an evolved Node-B, or eNB, the mobile terminals 40 may be referred to as user equipment, or UE, and the relay node 30 may otherwise conform to LTE standards specified in a technical report titled "3rd Generation Partnership Project; Technical Specification Group Radio Access Network; Evolved Universal Terrestrial Radio Access (E-UTRA); Relay architectures for E-UTRA (LTE-Advanced); (Release 9)," 3GPP TR 36.806, v. 9.0.0 (March 2010). System information may thus need to change, to name just a few examples: (1) when the base station 20 starts a new MBSFN service requiring the allocation of a specific MBSFN subframe allocation that cannot be used by other services; (2) when the system 10 is congested and the base station 20 needs to bar some services or users from accessing the system 10; or (3) when the base station 20 needs to increase or decrease the capacity of some control channel (e.g., the Random Access Channel RACH, or the Physical Uplink Control Channel, PUCCH).

Figure 4:
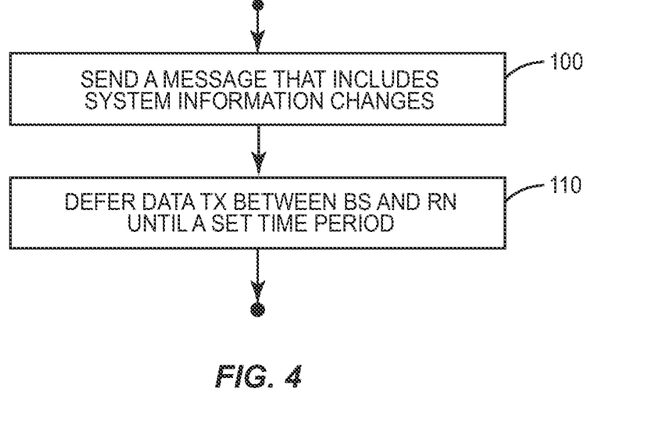
FIG. 4 is a logic flow diagram that illustrates a method implemented by a base station according to one or more embodiments for propagating system information changes to a relay node.

With the above described modifications and variations in mind, those skilled in the art will understand that the base station 20 generally performs the processing illustrated in FIG. 4 for propagating system information changes to the relay node 30. As shown in FIG. 4, processing includes sending to the relay node 30 a message that includes system information changes (Block 100). Processing further includes, upon sending the message, deferring data transmission between the base station 20 and the relay node 30 until a set time period (Block 110).

Those skilled in the art will also appreciate that the various "circuits" described may refer to a combination of analog and digital circuits, and/or one or more processors configured with software stored in memory 25 and/or firmware stored in memory 25 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a base station of a wireless communication system for propagating system information changes to a relay node that relays control signaling and data between the base station and one or more mobile terminals, the method comprising:
   sending to the relay node a message that includes system information changes; and
   applying those system information changes at the base station during a set time period that occurs after the message is sent; and
   ensuring that data transmission between the base station and the relay node does not occur after the base station sends the message but before the base station applies the system information changes, by deferring such data transmission until the set time period.

2. The method of claim 1, wherein said deferring comprises scheduling said data transmission to occur during the set time period, even though a time slot configuration of the base station permits said data transmission to occur after sending the message but before the set time period.

3. The method of claim 1, wherein said sending comprises sending the message to the relay node via dedicated signaling.

4. The method of claim 1, further comprising sending a control indicator to the relay node that directs the relay node to apply the system information changes immediately upon receiving those changes.

5. The method of claim 1, wherein the base station is configured to transmit data to the relay node according to a particular time slot configuration that specifies permissible and non-permissible time slots during which the relay node can and cannot receive data from the base station, respectively, and wherein said deferring comprises deferring data transmission to the relay node until the next permissible time slot that occurs during the set time period.

6. The method of claim 5, wherein a time slot configuration comprises a subframe configuration pattern.

7. The method of claim 1, wherein the base station is configured to only apply system information changes at the start of set modification periods that recur periodically and wherein said deferring comprises deferring data transmission between the base station and the relay node until at least the start of the next modification period.

8. The method of claim 1, further comprising identifying each sent system information change as belonging to either a first or a second class, and wherein said deferring comprises deferring data transmission between the base station and the relay node until the set time period only if any of the sent system information changes belong to the first class.

9. The method of claim 8, wherein the first class includes fundamental system information changes that fatally disrupt radio link connectivity between the base station and the relay node if not applied at the base station and the relay node at substantially the same time, and wherein the second class includes non-fundamental system information changes.

10. A base station in a wireless communication system, the base station comprising:
   an interface towards a relay node that relays control signaling and data between the base station and one or more mobile terminals;
   a system information controller configured to send to the relay node, via said interface, a message that includes system information changes and to apply those system information changes at the base station during a set time period that occurs after the message is sent; and
   a scheduler configured to ensure that data transmission between the base station and the relay node does not occur after the base station sends the message but before the base station applies the system information changes, by deferring such data transmission until the set time period.

11. The base station of claim 10, wherein the scheduler is configured to defer said data transmission by scheduling said data transmission to occur during the set time period, even though a time slot configuration of the base station permits said data transmission to occur after sending the message but before the set time period.

12. The base station of claim 10, wherein the system information controller is configured to send the system information changes to the relay node via dedicated signaling.

13. The base station of claim 10, wherein the system information controller is further configured to send a control indicator to the relay node that directs the relay node to apply the system information changes immediately upon receiving those changes.

14. The base station of claim 10, wherein said interface is configured to transmit data to the relay node according to a particular time slot configuration that specifies permissible and non-permissible time slots during which the relay node can and cannot receive data from the base station, respectively, and wherein the scheduler is configured to defer data transmission to the relay node until the next permissible time slot that occurs during the set time period.

15. The base station of claim 14, wherein a time slot configuration comprises a subframe configuration pattern.

16. The base station of claim 10, wherein the system information controller is configured to only apply system information changes at the start of set modification periods that recur periodically, and wherein the scheduler is configured to defer data transmission between the base station and the relay node until at least the start of the next modification period.

17. The base station of claim 10, wherein the system information controller is configured to identify each sent system information change as belonging to either a first or a second class, and wherein the scheduler is configured to defer data transmission between the base station and the relay node until the set time period only if any of the sent system information changes belong to the first class.

18. The base station of claim 17, wherein the first class includes fundamental system information changes that fatally disrupt radio link connectivity between the base station and the relay node if not applied at the base station and the relay node at substantially the same time, and wherein the second class includes non-fundamental system information changes.

19. The method of claim 8, further comprising sending to the relay node a second message that includes system information changes belonging to the second class and does not include any system information changes belonging to the first class, and upon sending the second message, refraining from deferring data transmission between the base station and the relay node until a set time period.

20. The base station of claim 17, wherein the system information controller is further configured to send to the relay node, via said interface, a second message that includes system information changes belonging to the second class and does not include any system information changes belonging to the second class, and wherein the scheduler is further configured, upon the sending of the second message, to refrain from deferring data transmission between the base station and the relay node until a set time period.

21. The method of claim 1, further comprising scheduling a particular data transmission to occur after the base station sends the message but before the set time period and wherein said deferring comprises re-scheduling that particular data transmission to occur during the set time period.

22. The base station of claim 10, wherein the scheduler is configured to:
   schedule a particular data transmission to occur after the base station sends the message but before the set time period; and
   defer that particular data transmission by re-scheduling the particular data transmission to occur during the set time period.

* * * * *

UNITED STATES PATENT AND TRADEMARK OFFICE
CERTIFICATE OF CORRECTION

PATENT NO. : 8,780,783 B2  
APPLICATION NO. : 13/090476  
DATED : July 15, 2014  
INVENTOR(S) : Mildh et al.

It is certified that error appears in the above-identified patent and that said Letters Patent is hereby corrected as shown below:

On the Title Page

On Page 2, in item (56), under "OTHER PUBLICATIONS", in Column 2, Lines 15-16, delete "Modicaition" and insert -- Modification --, therefor.

In the Specification

In Column 3, Line 24, delete "class" and insert -- class. --, therefor.

In Column 4, Line 25, delete "controller 28" and insert -- controller 26 --, therefor.

Signed and Sealed this
Fourth Day of August, 2015

Michelle K. Lee
*Director of the United States Patent and Trademark Office*